(12) United States Patent
Karlsson

(10) Patent No.: US 6,650,872 B1
(45) Date of Patent: Nov. 18, 2003

(54) METHOD AND DEVICE FOR ESTIMATING A CARRIER-TO-INTERFERENCE RATIO IN A RADIO COMMUNICATION SYSTEM

(75) Inventor: Anders Karlsson, Luleå (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/271,102

(22) Filed: Mar. 18, 1999

(30) Foreign Application Priority Data

Mar. 20, 1998 (SE) .............................................. 9800939

(51) Int. Cl.[7] .............................................. H04B 17/00
(52) U.S. Cl. ..................... 455/67.1; 455/450; 455/513; 455/226.2; 370/329; 370/341
(58) Field of Search ................................ 455/436–440, 455/450–452, 501, 509–513, 515, 516, 63, 67.1, 67.3, 226.1, 226.2, 226.3; 370/329, 341, 331, 332, 333

(56) References Cited

U.S. PATENT DOCUMENTS

| | | | |
|---|---|---|---|
| 5,151,919 A | 9/1992 | Dent | 375/1 |
| 5,157,709 A | 10/1992 | Ohteru | 379/58 |
| 5,285,447 A | 2/1994 | Hulsebosch | 370/69.1 |
| 5,295,153 A | 3/1994 | Gudmundson | 375/1 |
| 5,422,909 A | 6/1995 | Love et al. | 375/200 |
| 5,583,886 A | 12/1996 | Rohani et al. | 375/227 |
| 5,752,190 A | 5/1998 | Kaewell, Jr. et al. | 455/436 |
| 5,963,865 A * | 10/1999 | Desgagne et al. | 455/450 |
| 5,966,657 A * | 10/1999 | Sporre | 455/425 |
| 6,009,332 A * | 12/1999 | Haartsen | 455/450 |
| 6,041,227 A * | 3/2000 | Sumner | 455/412 |
| 6,091,954 A * | 7/2000 | Haartsen et al. | 455/447 |
| 6,119,011 A * | 9/2000 | Borst et al. | 455/452 |
| 6,131,049 A * | 10/2000 | Marsan et al. | 455/574 |
| 6,154,655 A * | 11/2000 | Borst et al. | 455/451 |
| 6,167,031 A * | 12/2000 | Olofsson et al. | 370/252 |
| 6,246,881 B1 * | 6/2001 | Parantainen et al. | 455/450 |
| 6,308,066 B1 * | 10/2001 | Ranta et al. | 455/432 |

FOREIGN PATENT DOCUMENTS

| | | |
|---|---|---|
| JP | 08182042 A | 7/1996 |
| SE | 469 580 | 7/1993 |
| WO | WO 92/17953 | 10/1992 |
| WO | WO 94/05097 | 3/1994 |
| WO | 99/00367 | 9/1999 |

OTHER PUBLICATIONS

Hansson, S.; International–Type Search Report; Feb. 18, 1999; Search Request No. SE 98/00247; pp. 1–4.
GSM Technical Specification, GSM 05.01, Jun. 1997, ETSI, France.
European Telecommunication Standard, DRAFT pr ETS 300911, Nov. 1997, ETSI, France.

* cited by examiner

Primary Examiner—Edward F. Urban
Assistant Examiner—Temica M. Davis
(74) Attorney, Agent, or Firm—Jenkens & Gilchrist, P.C.

(57) ABSTRACT

The carrier-to-interference ratio in a radio communication system is estimated by using measurements of the received signal strength in a communication channel within periods of time when transmission is discontinued and measurements of the received signal strength in the communication channel within periods of time with transmission.

42 Claims, 4 Drawing Sheets

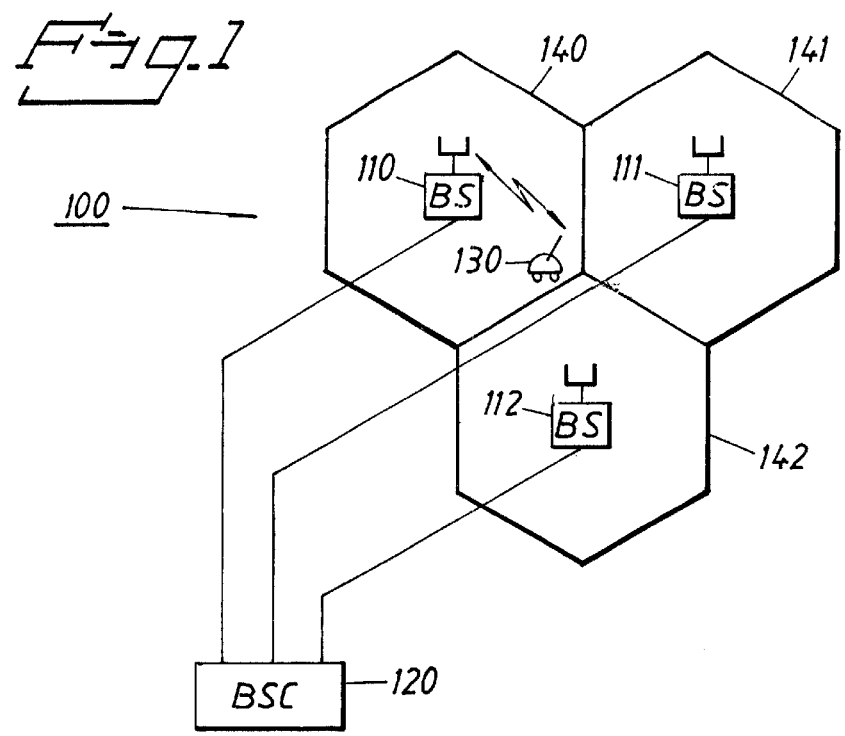
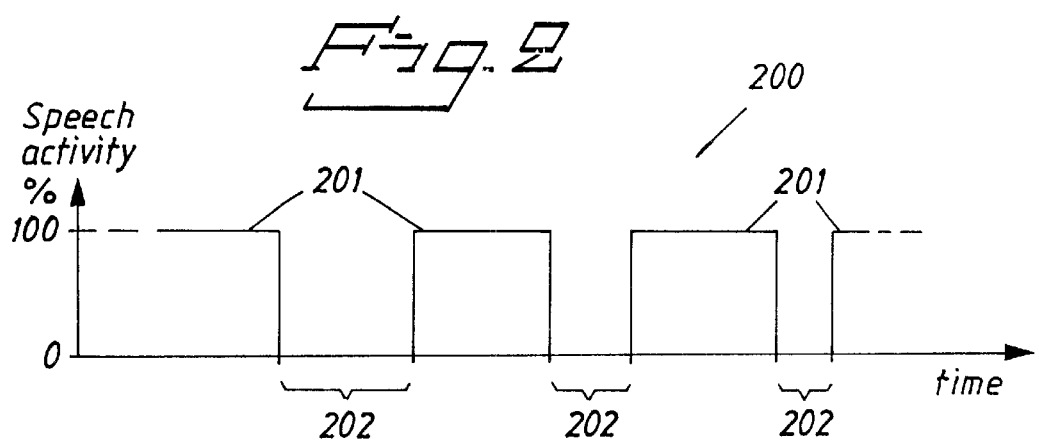
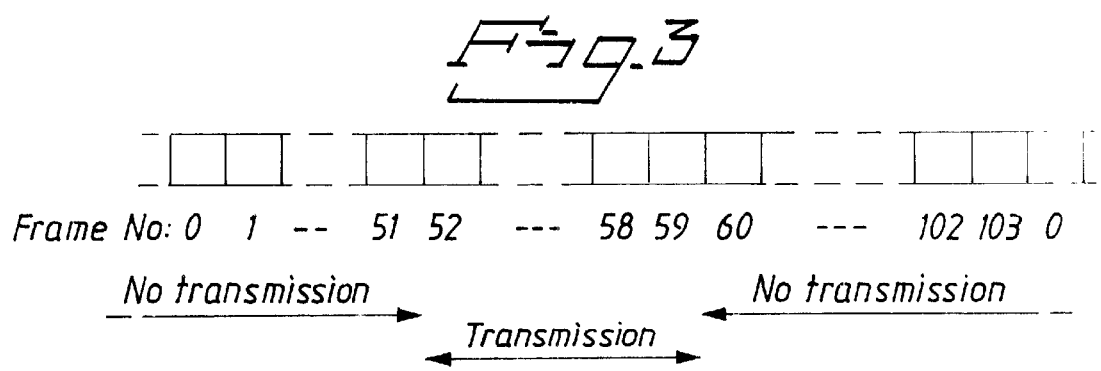

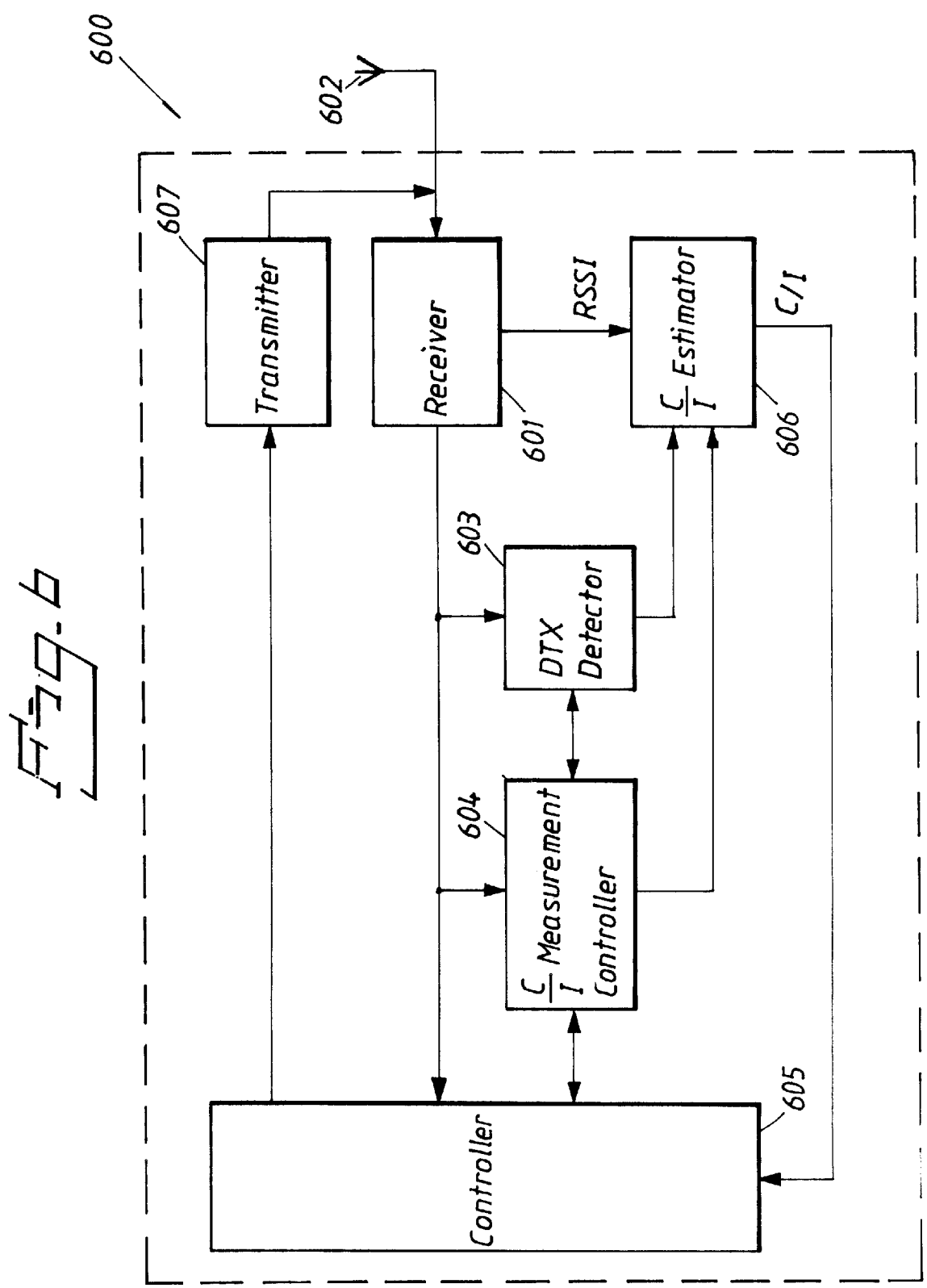

METHOD AND DEVICE FOR ESTIMATING A CARRIER-TO-INTERFERENCE RATIO IN A RADIO COMMUNICATION SYSTEM

TECHNICAL FIELD OF THE INVENTION

The present invention relates to a method of establishing the carrier-to-interference ratio in a radio communication system. The invention also relates to a communication device carrying out such a method.

DESCRIPTION OF THE PRIOR ART

In a communication system comprising a number of radio base stations and mobile communication devices communication is established between a mobile communication device and a base station by means of a radio channel, which is also referred to as a transmission link. Channel access is achieved by, for example, frequency division multiple access (FDMA), time division multiple access (TDMA), code division multiple access (CDMA) or combinations thereof.

When a transmission link has been established between a base station and a mobile communication device it is important to be able to measure the quality of the link. Several methods for doing this exist. According to one method the received signal strength indication, RSSI or RXLEV, is used. It is then simply assumed that the received signal strength indication is correlated to the quality of the transmission link. However, the received signal strength includes both the carrier and the interference and, hence, is not a good measure of the quality of the transmission link. According to a better method the bit error rate, RXQUAL, is used as an estimate of the quality of the transmission link, i.e. a small error bit rate corresponds to a high quality transmission link and vice versa. However, due to the data compression carried out before information is transmitted over a transmission link the bit error rate is quantified to a small amount of levels, e.g. eight levels in the standard of GSM (Global System for Mobile communication). Consequently, this method only gives a rough indication of the quality of the transmission link. Furthermore, the channel coding scheme used may not allow all bit errors to be detected, and the bit error rate will then only be an estimate of the quality of the transmission link. This is true, for example, for the channel coding scheme used in GSM. Moreover, the quality of the estimate is normally better for small bit error rates than for large bit error rates.

The ratio between the received signal strength of the carrier and the received signal strength of the interference, C/I, is a better measure of the quality of the transmission link. This parameter is used for designing cellular radio communication systems, for example during development of channel coding schemes and speech coder algorithms. The parameter is also important during cell-planning, i.e. determining the sites of the base stations and measuring power levels at different locations in the system. Furthermore, the communication system will gain valuable information if C/I can be measured by the base station or the mobile communication device when the communication system is in use. For example, the measured C/I information can make it possible for the communication system to perform hand-off to a transmission link of good quality at an advantageous opportunity.

Stand-alone C/I measurement equipment is known in the art. However, since they employ high quality receivers and advanced filtering techniques they are expensive and, hence, cannot be used in ordinary mobile communication devices.

Several methods are available for estimating the C/I parameter.

One method is disclosed in SE-A-469580. The method, which involves at least two base stations, can only be used in up-link, i.e. the transmission link from a mobile communication device to a base station. The signal strength of the carrier is measured by the base station with which the mobile communication device has established a communication link. At the same time the second base station measures the signal strength from the same mobile communication device. This signal strength is then used as an estimate of the interference and an estimate of the C/I parameter is calculated. A major disadvantage of this method is that it is necessary for the two base stations to cooperate and that only an estimate of the C/I in up-link can be established.

Another method is disclosed in JP-A-08/182042. The signal strength of the carrier is measured on the established communication link and the interference is estimated by a measuring the signal strength of a currently empty channel. However, the accuracy of the estimate of C/I provided by this method is poor since the interference experienced on the established communication link may be quite different from the interference measured on the empty channel, i.e. at a different radio frequency.

The method disclosed in U.S. Pat. No. 5,583,886 concerns CDMA systems. Each of a plurality of transmitters transmits one of a plurality of signals which are known to the receiver. A plurality of channel responses are estimated by measuring the known signals at the receiver. The channel responses are then used to determine the C/I parameter. A drawback with this method is that it is required that the receiver knows the plurality of signals and the timing thereof. Furthermore, the transmission of known signals occupies resources of the system. WO-A-92/17953 refers to the measurement of the carrier-to-interference of a selected target channel before hand-off. The mobile communication device measures the received signal strength indication of the selected target channel when the channel is transmitting and not transmitting. The measurements are transferred to the source base station which determines the C/I parameter from the measurements and decides whether hand-off should be carried out to the selected target channel. The disadvantages of this method are that the C/I is only measured on target channels and not on the source channel and that the measurements are only performed occasionally. The method does not provide for continuous measurements.

It is an object of the present invention to provide a method of measuring the C/I parameter which overcomes or alleviates the above mentioned problems.

The invention is also directed to a communication device incorporating the method of measuring the C/I parameter.

SUMMARY

According to one aspect of the present invention there is provided a method of estimating the carrier-to-interference ratio in a radio communication system comprising the steps of selecting a radio communication channel allowing discontinuous transmission, measuring the received signal strength in the communication channel within periods of time when transmission is discontinued, measuring the received signal strength in the communication channel within periods of time with transmission and calculating an estimate of the carrier-to-interference ratio of the channel by means of the signal strengths measured in the previous steps.

According to a further aspect of the present invention there is provided a radio communication device comprising a radio receiver adapted for receiving a signal picked up by an antenna at a selected channel, means for measuring the received signal strength at the selected channel, controller means for establishing periods of time corresponding to transmission and discontinued transmission, respectively, within the selected channel and calculation means for estimating the carrier-to-interference ratio, C/I, from the measured signal strength within periods of discontinued transmission and the measured signal strength within periods of transmission.

The method and device achieve the advantages that the carrier-to-interference ratio can be estimated continuously and that it can be estimated without affecting the communication on a channel.

These advantages are achieved by measuring the signal strengths at a channel within periods of transmission and discontinued transmission. This can be done continuously without affecting the communication on the channel.

Furthermore, the ratio can be measured and estimated using a relatively simple hardware and software solution thereby allowing the method to be implemented in a small physical application, such as a portable communication device.

This advantage is achieved by the possibility of using a conventional RSSI detector.

According to a further aspect of the present invention there is provided a method of controlling channel selection within a radio communication system having at least two communication devices comprising the steps of establishing a communication channel between a first and a second communication device, providing a list of frequencies which may be used for a communication channel and for each frequency establishing whether discontinued transmission is activated and if so measuring the received signal strength at the frequency within periods of time when transmission is discontinued, measuring the received signal strength at the frequency within periods of time with transmission, and calculating an estimate of the carrier-to-interference ratio at the frequency by means of the signal strengths measured in the two previous steps, ranking the frequencies of the list according to the corresponding estimated levels of C/I, communicating information representing at least the frequency having the greatest C/I to at least the first and the second communication devices, and setting up a communication channel between the first and the second communication devices using at least the frequency having the greatest C/I.

This method achieves the advantage that a communication channel having the greatest C/I ratio can be set up without having to disturb communication on the channel when the C/I ratio is measured and estimated.

This advantage is achieved by measuring the signal strengths at a channel within periods of transmission and discontinued transmission. This c an be done without affecting the communication on the channel.

Preferably, information representing at least two of the frequencies having the greatest C/I is communicated to the at least first and second communication devices and the communication channel set up between the at least first and second communication devices uses at least the two frequencies having the greatest C/I in a frequency hopping scheme.

The advantage of this is that a frequency hopping scheme can be establish ed based on estimated C/I ratio s without the measurements needed for estimating these C/I ratios affecting the communication at the corresponding frequencies.

This advantage is achieved by measuring the signal strengths at the frequencies within periods of transmission and discontinued transmission. This can be done without affecting the communication at the frequencies.

Preferably C/I is estimated by calculating according to the formula $(C/I)_{dB} \approx ((C+I)/I)_{dB} = (C+I^*)-(I^*)$ where the measured signal strength, in dBm, corresponding to periods of discontinued transmission is labeled $(I^*)$ and the measured signal strength, in dBm, corresponding to periods of transmission is labeled $(C+I^*)$ The advantage of this is that the calculation needed for estimating C/I in dB is very simple and, hence, easy and cheap to implement in a device.

This advantage is achieved by estimating C/I by a simple subtraction.

Preferably, if C/I is estimated by calculating according to the formula $(C/I)_{dB} \approx ((C+I)/I)_{dB} = (C+I^*)-(I^*)$ the thus estimated value of C/I is corrected according to a correction function.

The advantage of this is that the error ensuing at small values of C/I—due to the fact that the signal strength of the carrier plus the disturbances are measured at the same time—can be compensated.

This advantage is achieved by the correction function.

Preferably, the method comprises the steps of reading out from a memory a pre-stored correction value which corresponds to the estimated C/I value and correcting the estimated C/I value by using the read out correction value according to a correction function.

Preferably, the device comprises a memory for holding at least one pre-stored correction value, each pre-stored correction value being associated with a corresponding C/I value, read out means for reading out a correction value from the memory and providing the read out correction value to the calculation means. Furthermore, the calculation means is adapted to correct the estimated C/I by means of the read out correction value according to a correction function.

The advantage of this method and this device is that the correction value or values can be pre-calculated and pre-stored and, hence, quickly retrieved when needed.

This advantage is achieved by pre-calculating and pre-storing the correction value or values in the memory.

According to a further aspect of the present invention there is provided a method of operating a communication device having a radio receiver and a radio transmitter, the method comprising the steps of selecting a radio communication channel allowing discontinuous transmission, measuring the received signal strength in the communication channel within periods of time when transmission is discontinued, measuring the received signal strength in the communication channel within periods of time with transmission, and transmitting information representing the signal strengths measured in the previous steps by means of the transmitter.

According to a further aspect of the present invention there is provided a radio communication device comprising a radio receiver adapted for receiving a signal picked up by an antenna at a selected channel, means for measuring the received signal strength at the selected channel, controller means for establishing periods of time corresponding to transmission and discontinued transmission, respectively, within the selected channel, and a transmitter for transmitting information representing the measured signal strength within periods of discontinued transmission and for transmitting information representing the measured signal strength within periods of transmission from the communication device.

This method and device achieve the advantage that though the measurements needed for establishing the C/I ratio are performed by the communication device, the latter does not need to be equipped with the calculation means needed for calculating the estimate of the C/I ratio.

This advantage is achieved by transmitting the measured signal strengths from the communication device.

BRIEF DESCRIPTION OF THE DRAWINGS

FIG. 1 illustrates a communication system according to an aspect of the present invention;

FIG. 2 illustrates a typical speech pattern in a communication system according to an aspect of the present invention;

FIG. 3 illustrates an example of a TDMA frame subset that always should be transmitted during discontinuous transmission;

FIG. 6 illustrates a communication device according to an embodiment of the present invention.

DETAILED DESCRIPTION OF EMBODIMENTS

Figure 4:
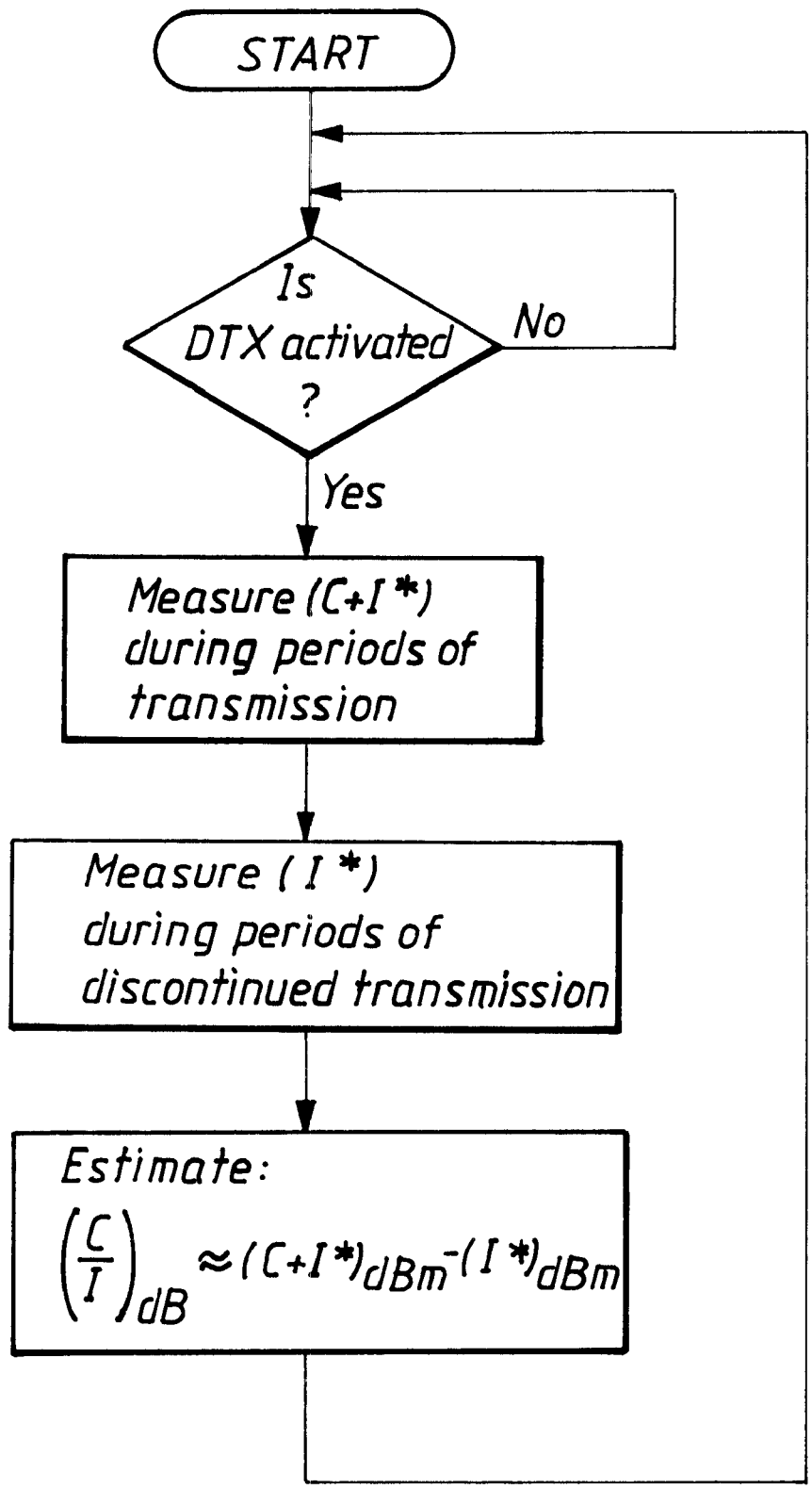
FIG. 4 is a flow diagram illustrating an aspect of the present invention.

While the following description is in the context of cellular communication systems involving portable or mobile radio telephones and/or personal communication networks, it will be understood by those skilled in the art that the present invention may be applied to other communication applications.

FIG. 1 illustrates a communication system 100 comprising a number of radio base stations, BS, 110, 111, 112 which are connected to a base station controller, BSC, 120 and a mobile communication device 130. The radio coverage by each base station 110, 111, 112 defines a cell 140, 141, 142. These cells are illustrated by hexagons in FIG. 1. Communication between a mobile communication device and a base station is established by a radio channel. Channel access is achieved by, for example, frequency division multiple access (FDMA), time division multiple access (TDMA), code division multiple access (CDMA) or combinations thereof.

Normally C/I is set to be equal to the ratio between the strength of a carrier signal (referred to as C) in a radio channel and the strength of an interference signal (referred to as I) where the interference signal originates from other base stations or mobile communication devices which use the same frequency and, for a TDMA system, use the same time-slot. However, other signals may also disturb a carrier signal, for example, signal power originating from adjacent frequencies but leaking into the frequencies of the radio channel (referred to as A) and an average radio noise level (referred to as N). A and N are much smaller than I in an urban cellular network. In the countryside, however, N is normally larger than I. Here, C/I* is defined to be equal to the ratio between the strength of the carrier signal and the strength of disturbing signals, i.e. I* is equal to the sum of A, N and I.

The value of C/I normally fluctuates rapidly due to fast fading. The contribution owing to the fast fading has a zero mean value. Therefore, the value of C/I is often averaged over a pre-determined period of time which, if the period of time is chosen to be sufficiently long, eliminates these fluctuations.

Most access systems allow the use of discontinuous transmission (DTX) and discontinuous reception (DRX). Discontinuous transmission may be used, for example, to transmit voice signals only during periods of time when speech is present. In FIG. 2 a typical speech pattern 200 in a communication system is illustrated. The speech pattern consists of periods of speech activity 201 intermingled with periods of silence 202 or no speech activity. Several advantages are achieved by discontinuing transmission during periods of silence or no speech activity. For example, the capacity of the radio communication system is used more efficiently, power consumption, which is especially important in a mobile communication device, is reduced, and the amount of radio interference in the radio communication system is reduced.

In GSM, which is a TDMA system, the structure of time frames, time slots and bursts are discussed in the ETSI standard GSM 05.01 version 5.3.0 (see especially FIG. 1) and discontinuous transmission is discussed in the ETSI standard GSM 05.08 version 5.5.0 (see especially chapter 8.3). The ETSI standards GSM 05.01 version 5.3.0 and GSM 05.08 version 5.5.0 are expressly incorporated herein by reference. In the ETSI standard GSM 05.08 version 5.5.0 chapter 8.3 the TDMA frame subset of the traffic channel, TCH, which always should be transmitted, is defined. For example, at full-rate the TDMA frame subset that always should be transmitted consists of the frame numbers (modulo 104) 52 to 59. This is illustrated in FIG. 3. A different scheme is used at half-rate. For speech, when no signaling or speech is to be transmitted, these TDMA frames are occupied by the silence descriptor (SID) speech frame. In other cases when no information is required to be transmitted, e.g. on data channels, a fill frame labeled L2 shall be transmitted as a fast associated control channel (FACCH) in the TDMA frame subset always to be transmitted.

Also in other kinds of TDMA systems, in FDMA systems and in CDMA systems discontinuous transmission is possible. An example of discontinuous transmission in a CDMA system is discussed in U.S. Pat. No. 5,295,153 which is expressly incorporated herein by reference.

The present invention takes advantage of the operation of discontinuous transmission. The signal strength of the carrier signal and the disturbances, (C+I*), is measured during transmission and the signal strength of the disturbances, (I*), is measured during the periods of time transmission is discontinued. An estimate of $(C/I)_{dB}$ is calculated by subtracting the signal strength of the disturbances, (I*), in dBm from the signal strength of the carrier signal and the disturbances, (C+I*), in dBm:

$$(C/I)_{dB} \approx (C+I^*) - (I^*)$$

This method is further illustrated by the flow diagram of FIG. 4. The error of an estimate of C/I calculated by this method will obviously be smaller the greater C is compared to I and vice versa. In many cases, however, the interval of interest includes levels where C/I is less than 10 dB. A more correct estimate is given by:

$$(C/I)_{dB} = 10 \log[10^{[(C+I^*)-(I^*)]/10} - 1]$$

where (C+I*) and (I*) have been determined in dBm. This formula is, however, relatively complex and, hence, takes a long time to calculate and requires a relatively large computational power.

In an alternative method, $((C+I)/I)_{dB}$ is first estimated by calculating (C+I*)−(I*) and a correction term, ct, is thereafter added to the result. The correction term, ct, is calculated by means of the following mathematical formula:

$$ct = 10 \log[10^{[((C+I)/I)_{dB}]/10} - 1] - ((C+I)/I)_{dB}$$

Figure 5:
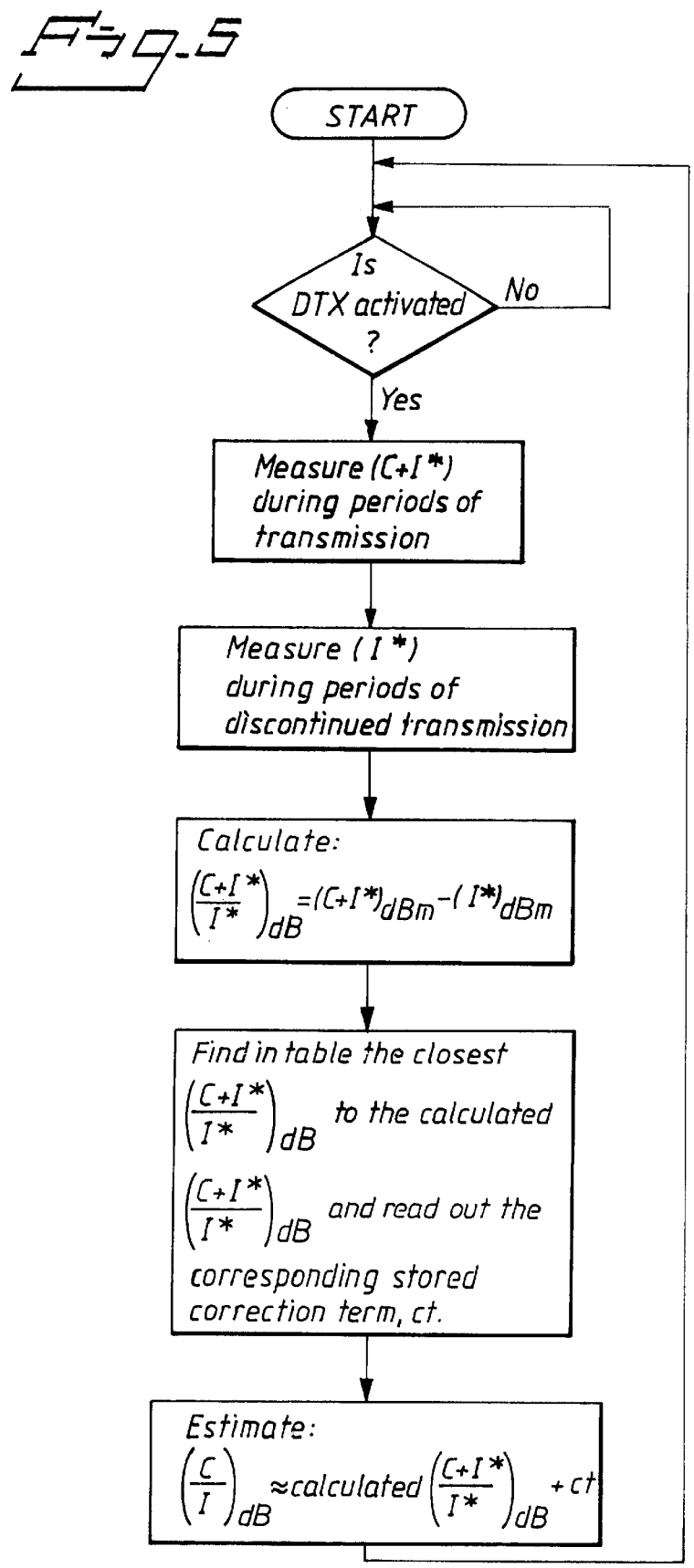
FIG. 5 is a flow diagram illustrating an aspect of the present invention.

The estimate of C/I can now be calculated as:

$$(C/I)_{dB} = ct + ((C+I^*)-(I^*))$$

where the term ct is calculated according to the formula above and (C+I*) and (I*) have been determined in dBm. The benefit of calculating C/I by means of the correction term, ct, is that a table can be set up with correction terms which have been pre-calculated for different $((C+I)/I)_{dB}$ values. For example, first the signal strength of the carrier signal and the disturbances, (C+I*), is measured during transmission and the signal strength of the disturbances, (I*), is measured during the periods of time transmission is discontinued. It is assumed that (C+I*) and (I*) are determined in dBm. Next, an estimate of $((C+I)/I)_{dB}$ is calculated by subtracting (I*) from (C+I*). The so calculated value of $((C+I)/I)_{dB}$ is thereafter compared with different $((C+I)/I)_{dB}$ values stored in the table, and the correction term corresponding to the stored $((C+I)/I)_{dB}$ value being closest to the calculated value of $((C+I)/I)_{dB}$ is read out from the table. Finally, C/I is estimated by adding the calculated value of $((C+I)/I)_{dB}$ to the read out correction term, ct. This method is further illustrated by the flow diagram of FIG. 5. By using this method of estimating C/I an estimate having a small error can be established quickly without the need for calculating complex mathematical formulas. This is especially advantageous in mobile communication devices, such as cellular phones, where power consumption and computational power are scarce resources. It should be understood that correction by means of a correction term may optionally be performed only within pre-determined intervals, e.g. for $((C+I)/I)_{dB}$ values smaller than 10 dB. It should be understood that the read out correction term of the described method may, optionally, be modified by the use of an interpolation algorithm before it is added to the calculated value of $((C+I)/I)_{dB}$. For example, it is possible to utilize a linear interpolation algorithm (of order n, where n is an integer greater than zero) which makes use of the calculated value of $((C+I)/I)_{dB}$, stored $((C+I)/I)_{dB}$ values and store correction terms.

According to an alternative method a correction factor, cf, is determined instead of a correction term. In this case the estimate of $((C+I)/I)_{dB}$, i.e. (C+I*)−(I*), is corrected by multiplying by the correction factor, cf:

$$(C/I)_{dB} = cf \times ((C+I^*)-(I^*))$$

where x indicates multiplication and the correction factor is calculated by means of the mathematical formula:

$$cf = \frac{10 \log[10^{[((C+I)/I)_{dB}]/10} - 1]}{((C+I)/I)_{dB}}$$

Also in this case a table of pre-calculated correction factors stored and linked together with the corresponding values of $((C+I)/I)_{dB}$ can be set up and used as discussed above.

In regard of GSM (full-rate), as is discussed above, when discontinuous transmission is activated the TDMA frame subset that always should be transmitted consists of the frame numbers (modulo 104) 52 to 59 (illustrated in FIG. 3). During the frames where no transmission takes place the signal strength of the disturbances, (I*), is measured, i.e. during frame numbers 0 to 51 and 60 to 103 (96 frames in total). During the frame numbers 52 to 59 either SID frames or, in the case where data is transmitted, L2 fill frames are transmitted. The signal strength of the carrier signal plus the disturbances, (C+I*), is measured during these frames. These measurements may be improved by measuring during other frames when transmission is known to occur, such as frames defined to comprise control information.

The signal strength measurements may be carried out either within one frame or during several frames. In the latter case the measured values may be averaged. For example, assuming that the time of a frame in GSM is 480 ms the measurement periods can be n times 480 ms, where n is an integer greater than zero. In this case, fast fading can be followed down to 480 ms or be eliminated by averaging over a large number of frames to thereby establish a long time averaged level. It should be noted that these measurements do not affect the communication on the transmission link.

Furthermore, the measurements can be carried out continuously and are not limited, for example, to moments when the transmission link is established. Moreover, the same hardware and/or software can be used as is used for measuring the received signal strength indication, RSSI or RXLEV.

The method of establishing C/I according to the present invention may be used not only by a mobile communication device, such as a cellular phone, but also by other communication devices, such as base stations. The only requirement is that discontinuous transmission is activated and, especially if data is transmitted, that transmission is discontinued during at least one frame. For example, to allow a mobile communication device to determine C/I on a down-link radio channel, i.e. from a base station to the mobile communication device, discontinuous transmission must be activated in the base station. Obviously, to allow a base station to determine C/I on an up-link radio channel, i.e. from a mobile communication device to a base station, discontinuous transmission must be activated in the mobile communication device.

In the case where discontinuous transmission is enabled and disabled in a mobile communication device by a command from a base station the same command may be used in the mobile communication device to enable and disable, respectively, the measurements needed for estimating C/I according to the present invention.

In radio communication systems making use of frequency hopping it is an advantage to measure C/I for each frequency of a frequency hopping scheme thereby adapting the scheme such that frequencies having low C/I are avoided. The method of establishing C/I according to the present invention can preferably be used for carrying out these measurements. For example, a base station may request a mobile communication device to measure and report C/I at frequencies used or not used momentarily by the communication device. This information can later be used by the base station to determine a preferred frequency hopping scheme. One way of doing this is by ranking the frequencies according to the level of the corresponding C/I. Returning to the example of GSM (full-rate), as is discussed above, for frequency hopping schemes up to 8 frequencies all the signal strength of the carrier signal plus the disturbances, (C+I*), can be measured at least once every 104 frame interval (see FIG. 3) while the signal strength of the disturbances, I*, can be measured up to 12 times during the same time interval (96 frames divided by 8 frequencies is equal to 12). This low number of measurements of the signal strength of the carrier signal plus the disturbances, (C+I*), can be compensated by measuring during a longer time interval and averaging the results.

FIG. 6 shows a block diagram of a communication device 600 illustrating an example of an implementation of the method of establishing C/I according to the present invention. The block diagram of FIG. 6 is prepared with the aim to illustrate aspects of the present invention. Some elements of the communication device, which are well known in the art, are not shown in detail. A receiver 601 is connected to an antenna 602 for receiving radio signals. A first output of the receiver 601 is connected to an input of a DTX Detector 603 and to an input of a C/I Measurement Controller 604 and to other circuits of the communication device, illustrated by the box labeled Controller 605. A second output of the Receiver 601 is connected to a C/I Estimator 606. An output of the DTX Detector 603 and an output of the C/I Measurement Controller 604 are connected to separate inputs of the C/I Estimator 606. The C/I Measurement Controller 604 and the DTX Detector 603 are also interconnected. An output of the C/I Estimator 606 is also connected to the Controller 605. The latter is further connected to an input of a transmitter 607. The output of the transmitter 607 is connected to the antenna 602.

In operation, the antenna 602 picks up radio signals and forwards these signals to the Receiver 601. The Receiver 601 provides the received signals to the DTX Detector 603, to the C/I Measurement Controller 604 and to the Controller 605 where it is further processed. The Receiver 601 also establishes the received signal strength, RSSI. The RSSI is forwarded to the C/I Estimator 606. When the DTX Detector 603 detects that discontinuous transmission is activated the C/I Estimator 606 and the C/I Measurement Controller 604 are enabled. The C/I Measurement Controller 604 establishes the periods of time the RSSI signal refers to the signal strength of a carrier signal plus disturbances, (C+I*) and the periods of time the RSSI signal refers to the signal strength of disturbances, I*, and this information is forwarded to the C/I Estimator 606. The C/I Estimator 606 estimates C/I from the information received from the Receiver 601, the DTX detector 603 and the C/I Measurement Controller 604 according to any one of the methods discussed above and forwards the result to the Controller 605 thereby allowing the value of C/I to be used by the communication device 600 in an optional way. In the case where a correction term or correction factor is used the table comprising the $((C+I)/I)_{dB}$ values and the associated correction terms/factors is stored in a memory (not shown). The C/I Estimator 606 has access to the table by means of a read out circuit (not shown).

It should be understood that the present invention may be implemented in several different ways. For example, a communication device may measure the signal strength of a carrier signal plus disturbances, (C+I*), and the signal strength of disturbances, I*, and, instead of estimating C/I itself, transmitting the results of the measurements by means of the transmitter 607 to a base station which performs the necessary calculations for estimating C/I. The advantage of this is that the communication device may not have to perform the calculations needed for estimating the C/I ratio. This is especially advantageous in portable communication devices where power and computational power are scarce resources.

What is claimed is:

1. A method of estimating a carrier-to-interference ratio in a radio communication system, comprising the steps of:

selecting a radio communication channel capable of discontinuous transmission;

establishing from signals received via the communication channel whether discontinued transmission is activated on the communication channel;

measuring a first received signal strength in the communication channel within periods of time when transmission is discontinued;

measuring a second received signal strength in the communication channel within periods of time during transmission; and estimating the carrier-to-interference ratio of the channel by using an estimate of a ratio of the measured second received signal strength to the measured first received signal strength.

2. A method of controlling channel selection within a radio communication system having at least two communication devices, comprising the steps of:

a.) establishing a communication channel between a first and a second communication device;

b.) providing a list of frequencies that can be used for the communication channel;

c.) for each frequency in the list carrying out the steps of:
  1.) establishing whether discontinuous transmission is activated and if so:
    i.) measuring a first received signal strength at the frequency within periods of time when transmission is discontinued;
    ii.) measuring a second received signal strength at the frequency within periods of time during transmission; and
    iii.) calculating an estimate of a carrier-to interference ratio at the frequency using the measured first and second signal strengths;

d.) ranking the frequencies of the list according to the corresponding estimated levels of the carrier-to-interference ratio;

e.) communicating information representing at least one frequency having a greatest estimated carrier-to-interference ratio to at least the first and the second communication devices; and f.) setting up a subsequent communication channel between the first and the second communication devices using at least the at least one frequency.

3. A method of controlling channel selection according to claim 2, wherein step e.) further includes communicating to at least the first and second communication devices, information representing at least two of the frequencies of the list of frequencies having the two greatest estimated carrier-to-interference ratios, and wherein step f.) further includes setting up the subsequent communication channel between the first and second communication devices using at least the two frequencies in a frequency hopping scheme.

4. A method of controlling channel selection according to claim 2, wherein the first measured signal strength corresponding to periods of discontinued transmission, I*, and the second measured signal strength corresponding to periods of transmission, C+I*, are determined in dBm and a carrier-to-interference ratio, C/I, is estimated in dB according to the formula:

$$(C/I)_{dB} \approx ((C+I)/I)_{dB} = (C+I^*) - (I^*).$$

5. A method of controlling channel selection according to claim 4, further comprising the step of:

correcting the estimated value of C/I according to a correction function.

6. A method of controlling channel selection according to claim 5, wherein the step of correcting the estimated value of C/I according to a correction function further includes, adding at least one correction term to the estimated C/I value.

7. A method of controlling channel selection according to claim 6, wherein at least one correction term, ct, is calculated according to the formula:

$$ct = 10 \log[10^{[((C+I)/I)_{dB}]/10} - 1] - ((C+I)/I)_{dB}.$$

8. A method of controlling channel selection according to claim 5, wherein the step of correcting the estimated value of C/I according to a correction function further includes multiplying the estimated C/I by at least one correction factor.

9. A method of controlling channel selection according to claim 8, wherein the correction factor, cf, is calculated according to the formula:

$$cf = \frac{10 \log[10^{[((C+I)/I)_{dB}]/10} - 1]}{((C+I)/I)_{dB}}.$$

10. A method of controlling channel selection according to claim 2, wherein step c.)1.)iii.) further includes:

providing a predetermined correction value which corresponds to the estimated C/I value; and correcting the estimated C/I value by using the predetermined correction value according to a correction function.

11. A method of controlling channel selection according to claim 10, wherein the step of correcting the estimated C/I value further includes adding the predetermined correction value to the estimated C/I value.

12. A method of controlling channel selection according to claim 10, wherein the step of correcting the estimated C/I value further includes multiplying the predetermined correction value by the estimated C/I value.

13. A method of controlling channel selection according to claim 10, wherein the step of providing the predetermined correction value further includes comparing the estimated C/I value with at least two pre-stored C/I values and reading out the predetermined correction value corresponding to the pre-stored C/I value closest in value to the estimated C/I value.

14. A method of controlling channel selection according to claim 2, wherein the first measured signal strength corresponding to periods of discontinued transmission, I*, and the second measured signal strength corresponding to peri ods of transmission, C+I*, are determined in dBm and the carrier-to-interference ratio, C/I, is estimated in dB by calculating according to the formula:

$$(C/I)_{dB} = 10 \log[10^{[(C+I^*)-(I^*)]/10} - 1].$$

15. A method of operating a communication device having a radio receiver and a radio transmitter, the method comprising the steps of:

selecting a radio communication channel capable of discontinuous transmission;

measuring a first received signal strength in the communication channel within periods of time when transmission is discontinued;

measuring a second received signal strength in the communication channel within periods of time during transmission; and transmitting information representing the measured first received signal strength and the measured second received signal strength to an external device by means of the transmitter to enable said external device to use the transmitted information to provide an estimate of a carrier-to-interference ratio of said communication channel.

16. A method according to claim 15, further comprising:

establishing from signals received at the selected channel whether discontinuous transmission is activated on the channel.

17. A radio communication device, comprising:

an antenna;

a radio receiver connected to the antenna and configured to receive at least one signal picked up by the antenna over a selected channel;

a measuring device connected to the radio receiver and configured to measure a received signal strength for the received signal;

a controller connected to the radio receiver and configured to determine periods of time corresponding to transmission and periods of time corresponding to discontinued transmission within the selected channel; and a calculation unit connected to the radio receiver, the measuring device and the controller, the calculation unit being configured to estimate a carrier-to-interference ratio, C/I, using at least one measured signal strength value from at least one of the periods of discontinued transmission and at least one measured signal strength value from at least one of the periods of transmission.

18. A communication device according to claim 17, wherein the calculation unit is further configured to estimate the C/I in dB by calculating according to the formula:

$$(C/I)_{dB} \approx ((C+I)/I = (C+I^*) - (I^*)$$

where the measured signal strength, in dBm, corresponding to periods of discontinued transmission is labeled I* and the measured signal strength, in dBm, corresponding to periods of transmission is labeled C+I*.

19. A communication device according to claim 18, wherein the calculation unit is further configured to correct the estimated C/I according to a correction function.

20. A communication device according to claim 19, wherein the correction function includes at least one correction term.

21. A communication device according to claim 20, wherein the correction term, ct, is calculated according to a formula:

$$ct = 10 \log[10^{[((C+I)/I)_{dB}]/10} - 1] - ((C+I)/I)_{dB}.$$

22. A communication device according to claim 19, wherein the correction function includes a multiplied correction factor.

23. A communication device according to claim 22, wherein the correction factor, cf, is calculated according to the formula:

$$cf = \frac{10 \log[10^{[((C+I)/I)_{dB}]/10} - 1]}{((C+I)/I)_{dB}}.$$

24. A communication device according to claim 17, further comprising:
   a memory connected to the calculation unit and configured to store a plurality of predetermined correction values, each predetermined correction value being associated with a corresponding C/I value; and
   wherein the calculation unit is further configured to read at least one of the predetermined correction values from the memory, and to correct the estimated C/I using the read predetermined correction value according to the correction function.

25. A communication device according to claim 24, wherein the correction function involves adding of the predetermined correction value to the estimated C/I value.

26. A communication device according to claim 24, wherein the correction function involves multiplying the predetermined correction value by the estimated C/I value.

27. A communication device according to claim 24, wherein the calculation unit is further configured to compare the estimated C/I value with at least two of the pre-stored C/I values.

28. A communication device according to claim 27, wherein the read out unit is further configured to read out the predetermined correction value corresponding to the pre-stored C/I value being closest in value to the estimated C/I value.

29. A communication device according to claim 17, wherein the calculation unit is further configured to estimate C/I in dB by calculating according to the following formula:

$$(C/I)_{dB} = 10 \log[10^{[(C+I^*)-(I^*)]/10} - 1]$$

where the measured signal strength, in dBm, corresponding to the periods of discontinued transmission is labeled I* and the measured signal strength, in dBm, corresponding to the periods of transmission is labeled C+I*.

30. A communication device according to claim 17, further comprising a detector connected to the radio receiver and the controller and configured to determine if discontinued transmission is activated on the selected channel.

31. A radio communication device, comprising:
   an antenna;
   a radio receiver connected to the antenna and configured to receive a signal picked up by the antenna over a selected channel;
   a measurement unit connected to the radio receiver and configured to measure a received signal strength associated with the signal;
   a controller unit connected to the radio receiver and configured to determine periods of time corresponding to transmission and periods of time corresponding to discontinued transmission within the selected channel;
   a detector connected to the radio receiver and the controller unit and configured to determine if discontinued transmission is activated on the selected channel; and
   a transmitter connected to the antenna, the measurement unit and the controller unit, the transmitter being configured to transmit information representing the measured signal strength for the signal received during at least one period of discontinued transmission, and information representing the measured signal strength for the signal received during at least one period of transmission.

32. A method of estimating a carrier-to-interference ratio in a radio communication system, comprising the steps of:
   selecting a radio communication channel capable of discontinuous transmission;
   measuring a first received signal strength in the communication channel within periods of time when transmission is discontinued;
   measuring a second received signal strength in the communication channel within periods of time during transmission; and
   calculating an estimate of the carrier-to-interference ratio of the channel by using the measured first and second signal strengths, wherein the first measured signal strength corresponding to periods of discontinued transmission, I*, and the second measured signal strength corresponding to periods of transmission, C+I*, are determined in dBm and a carrier-to-interference ratio, C/I, is estimated in dB according to the formula:

$$(C/I)_{dB} \approx ((C+I)/I)_{dB} = (C+I^*) - (I^*).$$

33. A method according to claim 32, further comprising the step of:
   correcting the estimated value of C/I according to a correction function.

34. A method according to claim 33, wherein the step of correcting the estimated value of C/I according to a correction function further includes, adding at least one correction term to the estimated C/I value.

35. A method according to claim 34, wherein at least one correction term, ct, is calculated according to the formula:

$$ct = 10 \log[10^{[((C+I)/I)_{dB}]/10} - 1] - ((C+I)/I)_{dB}.$$

36. A method according to claim 33, wherein the step of correcting the estimated value of C/I according to a correction function further includes multiplying the estimated C/I by at least one correction factor.

37. A method according to claim 36, wherein the correction factor, cf, is calculated according to the formula:

$$cf = \frac{10 \log[10^{[((C+I)/I)_{dB}]/10} - 1]}{((C+I)/I)_{dB}}.$$

38. A method of estimating a carrier-to-interference ratio in a radio communication system, comprising the steps of:
   selecting a radio communication channel capable of discontinuous transmission;
   measuring a first received signal strength in the communication channel within periods of time when transmission is discontinued;

measuring a second received signal strength in the communication channel within periods of time during transmission; and calculating an estimate of the carrier-to-interference ratio of the channel by using the measured first and second signal strengths, wherein the step of calculating an estimate of the carrier-to-interference ratio further includes:

providing a predetermined correction value which corresponds to the estimated C/I value; and correcting the estimated C/I value by using the predetermined correction value according to a correction function.

39. A method according to claim 38, wherein the step of correcting the estimated C/I value further includes adding the predetermined correction value to the estimated C/I value.

40. A method according to claim 38, wherein the step of correcting the estimated C/I value further includes multiplying the predetermined correction value by the estimated C/I value.

41. A method according to claim 38, wherein the step of providing the predetermined correction value further includes comparing the estimated C/I value with at least two pre-stored C/I values and reading out the predetermined correction value corresponding to the pre-stored C/I value closest in value to the estimated C/I value.

42. A method of estimating a carrier-to-interference ratio in a radio communication system, comprising the steps of:

selecting a radio communication channel capable of discontinuous transmission;

measuring a first received signal strength in the communication channel within periods of time when transmission is discontinued;

measuring a second received signal strength in the communication channel within periods of time during transmission; and calculating an estimate of the carrier-to-interference ratio of the channel by using the measured first and second signal strengths, wherein the first measured signal strength corresponding to periods of discontinued transmission, I*, and the second measured signal strength corresponding to periods of transmission, C+I*, are determined in dBm and the carrier-to-interference ratio, C/I, is estimated in dB by calculating according to the formula:

$$(C/I)_{dB} = 10 \ \log[10^{[(C+I^*)-(I^*)]/10} - 1].$$

* * * * *

UNITED STATES PATENT AND TRADEMARK OFFICE
CERTIFICATE OF CORRECTION

PATENT NO. : 6,650,872 B1
DATED : November 18, 2003
INVENTOR(S) : Anders Karlsson It is certified that error appears in the above-identified patent and that said Letters Patent is hereby corrected as shown below:

Column 2,
Line 18, replace "by a measuring" with -- by measuring --

Column 3,
Line 55, replace "This c an be" with -- This can be --
Line 65, replace "establish ed" with -- established --
Line 65, replace "ratio s" with -- ratios --

Column 4,
Line 10, replace "(C+1*)" with -- (C+1*) --

Column 6,
Line 21, replace "structure, of" with -- structure of --

Column 11,
Line 25, replace $"ct = 10 \log\left[10^{[((C+I)/I)_{dB}]/10} - 1\right] - ((C+I)/I)_{dB}"$
with $--ct = 10 \log\left[10^{[((C+I)/I)_{dB}]/10} - 1\right] - ((C+1)/1)_{dB}--$ Column 13,
Line 5, replace $"ct = 10 \log\left[10^{[((C+I)/I)_{dB}]/10} - 1\right] - ((C+I)/I)_{dB}"$
with $--ct = 10 \log\left[10^{[((C+I)/I)_{dB}]/10} - 1\right] - ((C+1)/1)_{dB}--$ Column 14,
Line 47, replace $"ct = 10 \log\left[10^{[((C+I)/I)_{dB}]/10} - 1\right] - ((C+I)/I)_{dB}"$
with $--ct = 10 \log\left[10^{[((C+I)/I)_{dB}]/10} - 1\right] - ((C+1)/1)_{dB}--$ Signed and Sealed this Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,650,872 B1  
DATED : November 18, 2003  
INVENTOR(S) : Anders Karlsson Page 1 of 1

It is certified that error appears in the above-identified patent and that said Letters Patent is hereby corrected as shown below:

Column 11,
Line 25, replace "$ct = 10 \log\{10^{[((C+I)/I)_{dB}]/10} - 1\} - ((C+I)/I)_{dB}$" with
-- $ct = 10 \log\{10^{[((C+I)/I)_{dB}]/10} - 1\} - ((C+I)/I)_{dB}$ --

Column 13,
Line 5, replace "$ct = 10 \log\{10^{[((C+I)/I)_{dB}]/10} - 1\} - ((C+I)/I)_{dB}$" with --
$ct = 10 \log\{10^{[((C+I)/I)_{dB}]/10} - 1\} - ((C+I)/I)_{dB}$ --

Column 14,
Line 47, replace "$ct = 10 \log\{10^{[((C+I)/I)_{dB}]/10} - 1\} - ((C+I)/I)_{dB}$" with --
$ct = 10 \log\{10^{[((C+I)/I)_{dB}]/10} - 1\} - ((C+I)/I)_{dB}$ --

Signed and Sealed this

Fifth Day of April, 2005

JON W. DUDAS  
*Director of the United States Patent and Trademark Office*